United States Patent [19]

Yarnall, Sr. et al.

[11] Patent Number: 4,745,882
[45] Date of Patent: May 24, 1988

[54] ELECTRONIC CONFINEMENT AND COMMUNICATIONS ARRANGEMENT FOR ANIMALS

[76] Inventors: Robert G. Yarnall, Sr.; Robert G. Yarnall, Jr., both of Ford St., P.O. Box 356, Kimberton, Pa. 19442

[21] Appl. No.: 60,835

[22] Filed: Jun. 12, 1987

Related U.S. Application Data

[63] Continuation-in-part of Ser. No. 932,608, Nov. 20, 1986.

[51] Int. Cl.$^4$ .............................................. A01K 15/00
[52] U.S. Cl. ...................................... 119/29; 340/573
[58] Field of Search ........................... 119/29, 96, 106; 340/573

[56]  References Cited

U.S. PATENT DOCUMENTS

| | | | |
|---|---|---|---|
| 3,589,337 | 6/1971 | Doss | 119/106 |
| 3,753,421 | 8/1973 | Peck | 119/29 |
| 3,777,712 | 12/1973 | Gardiner et al. | 119/29 |
| 3,980,051 | 9/1976 | Fury | 119/29 |
| 4,136,338 | 1/1979 | Antenore | 340/551 |
| 4,202,293 | 5/1980 | Gonda et al. | 119/29 |

FOREIGN PATENT DOCUMENTS

| | | | |
|---|---|---|---|
| 3237927 | 4/1984 | Fed. Rep. of Germany | 119/29 |
| 2455843 | 5/1979 | France | 119/29 |

Primary Examiner—Robert P. Swiatek
Assistant Examiner—R. Thomas Price
Attorney, Agent, or Firm—Ruth Moyerman

[57]  ABSTRACT

An arrangement for controlling the movements of animals is disclosed. A pair of signal-broadcasting wire loops is used, arranged in a concentric fashion, to define the desired confinement area. As the animal approaches the inner wire loop, a receiver worn by the animal will pick up the broadcasted signal and give the animal a mild shock and/or emit an unpleasant noise. If the animal ignores these deterrents and continues to move out of the confinement area, its receiver will pick up the signal emitted by the outer wire, where this signal will trigger an alarm located at a base station (the owner's home), indicating to the owner that the animal has ignored the signals and is leaving the confinement area. The arrangement further includes circuits for automatically deactivating the shock and noise devices after the animal escapes confinement and radio communication circuits whereby the owner can communicate with voice to the animal to command it back to confinement, after which the system can be reactivated.

14 Claims, 4 Drawing Sheets

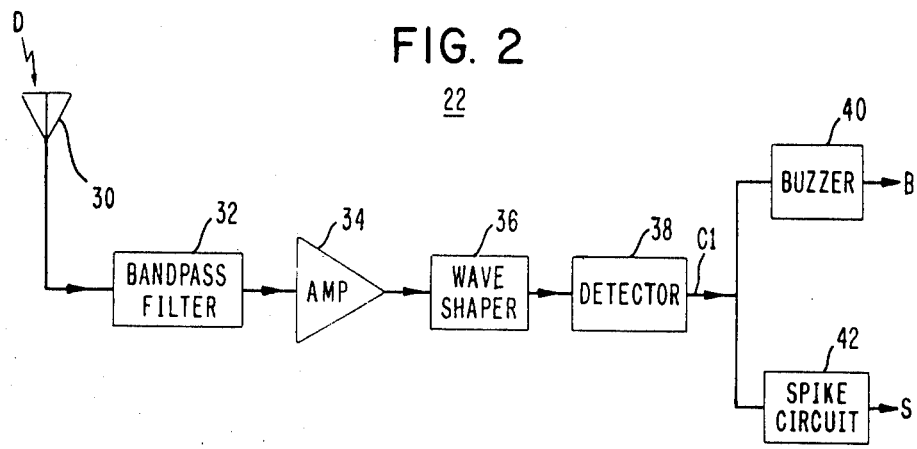

ELECTRONIC CONFINEMENT AND COMMUNICATIONS ARRANGEMENT FOR ANIMALS

CROSS REFERENCE TO RELATED APPLICATION

This is a continuation in part of application Ser. No. 932,608 filed Nov. 20, 1986 entitled ELECTRIC CONFINEMENT ARRANGEMENT FOR ANIMALS.

BACKGROUND OF THE INVENTION

1. Field of the Invention

The present invention relates to an electronic confinement arrangement for animals and, more particularly, to a wire fence confinement arrangement which will cause a deterrent signal to be given to an animal as it approaches the boundary and also transmit an alarm signal to the owner if the animal ignores the deterrent and leaves the confinement area. It also permits the owner to communicate with the animal by voice carried by radio transmissions.

2. Description of the Prior Art

It is often advantageous to confine an animal, for example, a dog, to a certain area and have some means to teach the animal not to leave the area. Alternatively, there are also situations where one would like to prohibit an animal from entering a designated area, for example, a garden or children's play area. Many times, it is impossible for the owner to constantly observe the animal, and another type of surveillance is necessary.

One system for teaching an animal to stay in a certain area is disclosed in U.S. Pat. No. 3,980,051 to Fury which includes a first ultrasonic pulse transceiver worn by a trainer and a second ultrasonic transceiver worn by the animal. The round-trip transit time of the pulse from the trainer to the dog and back to the trainer is monitored by the trainer's device. The device will then transmit a dog whistle sound when the transit time exceeds a predetermined value as set by the trainer. A problem with this arrangement is that it is not well suited to confining an animal to a designated area, since the transit time to one boundary may be different than the transit time to another boundary; for example, the distance between adjacent backyards. Further, it is possible that the animal will ignore the dog whistle sound and wander away from the designated area.

An alternative prior art arrangement is disclosed in U.S. Pat. No. 3,753,421 to Peck in which an arrangement for controlling an animal to prevent it from moving out of or into a restricted area is disclosed. A signal-emitting wire is used to define the restricted area and the animal wears a receiver in the form of a collar. When the animal nears the wire, the collar picks up the transmitted signal which triggers a circuit in the collar to give the animal an electric shock. Like the Fury arrangement, however, animals may ignore the electric shock given by the Peck collar and move out of the restricted area.

Thus, there remains in the prior art a need for an animal confinement system which is capable of signalling a trainer or owner when the animal has ignored the deterrent signal and has crossed the designated boundary line.

SUMMARY OF THE INVENTION

The problem remaining in the prior art is addressed by the present invention which is related to an electronic confinement arrangement for animals, and, more particularly, to a wire fence confinement arrangement which will cause a deterrent signal to be given to an animal as it approaches the boundary and also transmit an alarm to the owner if the animal ignores the deterrent and leaves the confinement area.

The present invention utilizes a pair of signal-emitting wire loops in a concentric arrangement and a receiver worn by the animal. The first, or inner, loop transmits a signal which causes the receiver to produce an annoying audio signal or an electrical shock, or both. If the animal ignores this deterrent and approaches the second, or outer, loop, the signal emitted by the second loop will trigger the animal's receiver to transmit an "escape" alarm signal to a unit located at a base location (for example, in the owner's house).

An additional aspect of the present invention is the ability to confine a number of animals to the same area and provide a means of indicating which particular animals have approached the boundary or have left the confinement area. In accordance with this aspect of the invention, each animal receiver unit broadcasts a different "escape" alarm signal back to the base location. The receiver at the base location is able to discern between the different frequencies and indicate by an appropriate means which animal has left.

A further aspect of the present invention is the ability of the system to automatically deactivate the deterrent signal when the animal escapes the confinement area. Such deactivation is required so as not to shock or annoy the animal if it attempts to return to confinement as a result of voice commands from the owner, which commands are carried by radio transmission and received and broadcast audibly to the animal by the animal's receiver.

Other and further aspects of the present invention will be apparent during the course of the following discussion.

BRIEF DESCRIPTION OF THE DRAWING(S)

FIG. 2 illustrates an exemplary deterrent circuit included in the animal's receiver for the arrangement of FIG. 1.

FIG. 3 illustrates an exemplary alarm circuit included in the animal's receiver for the arrangement of FIG. 1.

FIG. 4 illustrates an exemplary alarm receiver located at the base location of the arrangement of FIG. 1.

DETAILED DESCRIPTION OF THE PREFERRED EMBODIMENT(S)

Figure 1:
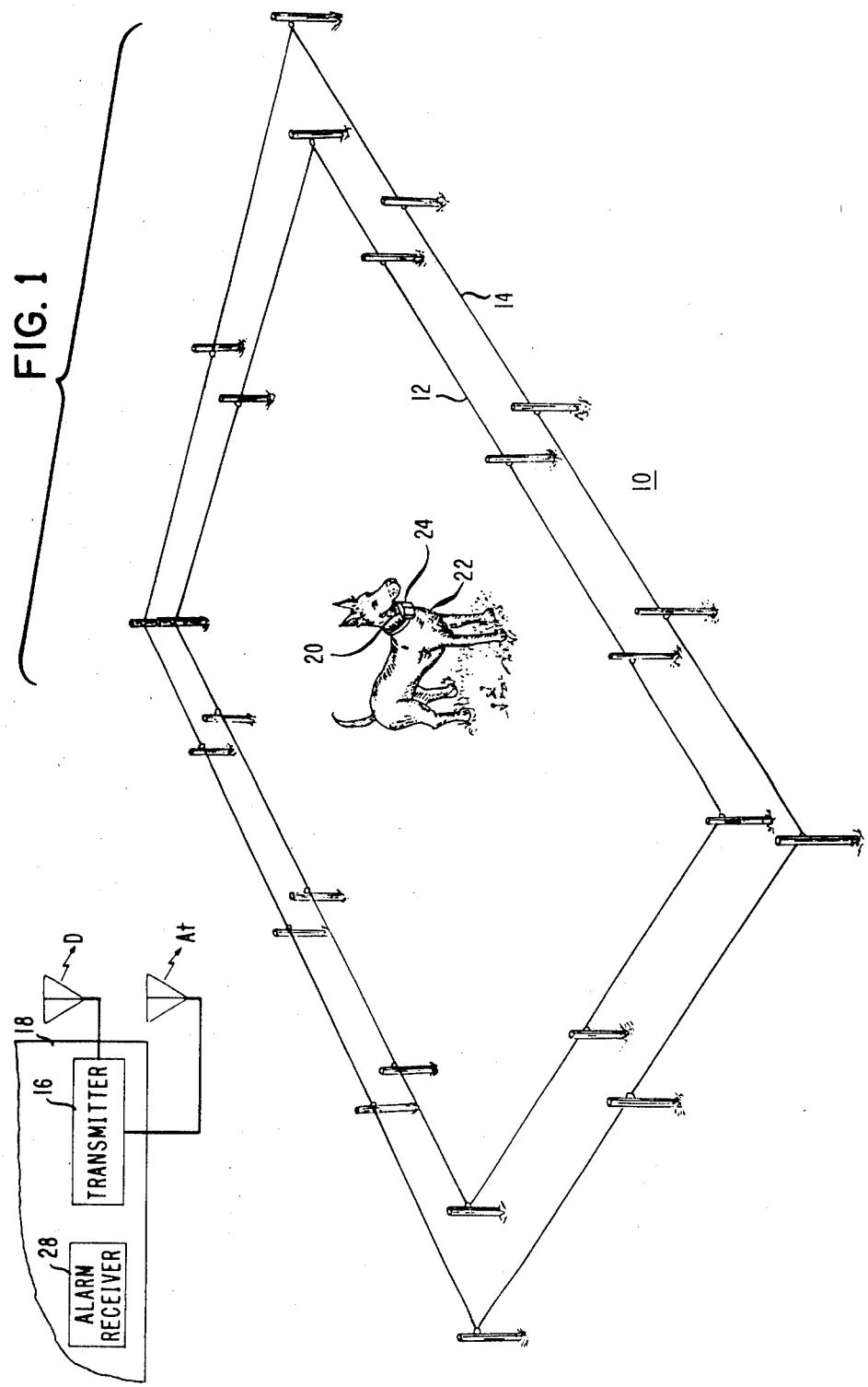
FIG. 1 illustrates an exemplary confinement arrangement of the present invention.

FIG. 1 illustrates an exemplary confinement arrangement 10 of the present invention. In this particular application of the present invention, it is desired to keep a dog from leaving a designated area, presumably a pen or a yard. An inner wire loop 12 and outer wire loop 14 define the perimeter of the designated area. Loops 12 and 14 may be either above or below ground and are capable of broadcasting signals provided by a transmitting unit 16 located at a base station 18. Transmitting unit 16, which may be any type of transmitter design well known in the art capable of generating an oscillating signal at a predetermined frequency, transmits a first deterrent signal D to inner loop 12 and a second alarm trigger signal AT to loop 14. Loops 12 and 14 thus function to broadcast their respective signals in the local area. The frequencies employed in practicing the present invention are chosen to eliminate the possibility of interference between loops 12 and 14. For example, deterrent signal D may have a frequency in the range of 10-15 kHz, and alarm trigger signal AT may have a frequency in the range of 20-25 kHz.

The animal wears receiver unit 20 (for example, on a special collar) which is responsive to both signals D and AT. As the animal nears the border of the restricted area defined by inner wire loop 12, receiver 20 will pick up broadcasted deterrent signal D. Upon reception of signal D, a deterrent circuit 22 of receiver 20 will utilize signal D to generate a mild electrical shock S which is applied to the animal to encourage the animal to move away from the border of the area. Deterrent circuit 22 may also generate an audible output signal which is unpleasant to the animal (for example, a dog whistle sound), as an additional deterrent signal. A detailed description of exemplary deterrent circuit 22 follows in association with the discussion of FIG. 2.

In most cases, the use of the electrical shock and/or the audio signal will be sufficient to cause the animal to move away from the edge of the confinement area. However, some animals may ignore both of these deterrents and continue to wander out of the confinement area. The wandering animal will then come within the broadcast range of outer loop 14. Receiver 20 includes an alarm trigger circuit 24 which is receptive to alarm trigger signal AT broadcast by outer loop 14, where FIG. 3 illustrates an exemplary configuration of alarm trigger circuit 24. Upon reception of signal AT, alarm trigger circuit 24 will broadcast an alarm activation signal A back to alarm receiver 28 located at base station 18. Therefore, if the animal leaves the confinement area, receiver 20 will activate the owner's alarm, warning him that the animal has ignored the deterrents and is escaping.

In an alternative embodiment of the present invention, a plurality of different alarm circuits 24, each capable of broadcasting a different frequency, may be utilized when a number of different animals are confined to the same area. Alarm receiver 28 is then able to receive the different frequencies, sounding a different alarm signal for each frequency. In this manner, the owner is able to identify which animal has moved out of the designated confinement area.

An exemplary deterrent circuit 22 which is worn by a confined animal is illustrated in FIG. 2. It is to be understood that the circuit is exemplary only, and any circuit capable of receiving a broadcasted signal and generating an electrical shock and audio outut signal may be used in practicing the invention.

Referring to FIG. 2, signal D, broadcast by inner loop 12, will be picked up by antenna 30 as the animal nears the loop. Signal D then passes through filter 32 which eliminates frequencies below 60 KHz and above a level used by the confinement system. In the exemplary arrangement of FIG. 2, the frequency of 100 KHz is chosen as the upper limit of filter 32. As shown, filter 32 is a bandpass filter. Alternatively, a pair of band rejection filters at 60 KHz and 100 KHz may also be used. In general, any filtering scheme capable of limiting the frequency range of the signal passing through the remainder of circuit 22 may be used.

Referring back to FIG. 2, the output from filter 32 is subsequently applied as an input to amplifier 34 which functions to boost the signal level of the transmitted deterrent signal to a level sufficient to energize the remainder of the circuitry. An amplifier with a gain of, for example 100, is sufficient for this purpose. The output from amplifier 34 may then be passed through a wave shaper 36 which uses circuitry well known in the art to "smooth out " the shape of the signal since low noise levels, amplified by amplifier 34 may interfere with the operation of circuit 22. However, to reduce the size, cost and complexity of deterrent circuit 22, wave shaper 36 may be eliminated, the penalty being some degradation in the performance of the system.

The output signal from wave shaper 36 is then applied as an input to detector 38. Detector 38, which may be a phase detector, will detect the presence of the known frequency (10-15 KHz, for example) of deterrent singal D and produce as an output control signal C1. Control signal C1 is utilized to trigger buzzer 40 which emits sound B which is unpleasant to the animal (for example, a dog whistle). Additionally, control signal C1 triggers spike circuit 42 which produces a pulse output S of sufficient voltage and amperage so as to give the animal a mild electrical shock. In operation of the invention, the output of deterrent circuit 22 may be configured so that only one of these two outputs is provided, if so desired. Buzzer 40 and spike circuit 42 comprise components well known in the art for providing the desired output signals.

When the animal is within the signal field of the inner loop (wire 12), receiver 20 will activate a transmitter in the collar. This new signal, F(c), may be, perhaps, 70 KHz. This signal would be transmitted to the base station. After the base station has received the signal F(c), a relay would be activated to alert the owner that the animal is presently in the F(c) signal field, and is receiving a deterrent.

An examplary circuit 24 for activating the pre-alarm signal at the base station is shown in FIG. 3. As stated above, if the animal ignores the deterrent signals from circuit 22 and continues to wander from the designated confinement area, it will enter the field of outer wire loop 14 and the animal's receiver 20 will pick up alarm trigger signal AT broadcast by outer loop 14. As stated above, frequencies in the range of 20 to 25 KHz may be broadcast over outer wire loop 14 without interfering with the lower frequency signals broadcast by inner wire loop 12.

In a similar fashion as deterrent circuit 22, the higher frequency alarm trigger signal AT, broadcast by outer loop 14, will be picked up by an antenna 50 included in alarm circuit 24 and then passed through filter 52, filter 52 being similar in form and function to filter 32 of circuit 22. The filtered output signal from bandpass filter 52 is subsequently passed through amplifier 54 and shaping circuit 56, both amplifier 54 and shaper 56 being similar to their like components in deterrent circuit 22. The output of wave shaper 56 is then applied as an input to detector 58, where detector 58 may be a phase detector. Upon detecting the presence of alarm signal AT, detector 58 generates an output control signal C2 which is applied as an input to turn on oscillator 60. Oscillator 60 is used to generate as an output oscillating signal A at the desired alarm frequency, for example 50 KHz. This alarm activation signal A is then passed through a wave shaper 62 and amplified by amplifier 64 before being broadcast by antenna 66 back to alarm receiver 28 located at base station 18 (not shown).

FIG. 4 illustrates an exemplary alarm receiver 28 for providing a warning signal to the owner when an animal has moved away from the designated confinement area. Similar to the operation of circuits 22 and 24, alarm receiver 28 comprises antenna 70 for reception of alarm activation signal A is generated by an alarm trigger circuit 24 worn by the animal. The received signal subsequently passes through filtering means, illustrated in the embodiment of FIG. 4 as first band reject filter 72 and second band reject filter 74, where filter 72 is set to reject 60 KHz and filter 74 is set to reject 100 KHz. Such an arrangement of a pair of band reject filters may be utilized interchangeably with bandpass filters 32 and 52 described above.

The filtered alarm activation signal is then amplified by amplifier 76 and returned to a "smooth" and clean waveform by wave shaper 78, so as to rid the signal of any spurious signal noise introduced by amplifier 76. The output from wave shaper 78 is then applied as an input to a detector 80, where detector 80 may be a phase detector well known in the art for ascertaining the presence of the predetermined broadcast frequency (50 KHz, for example) animal's alarm activation signal. Upon reception of this alarm signal, detector 80 produces an alarm control indicator AC2 which activates alarm unit 82. Alarm unit 82 is used to provide an indication that the animal has left the confinement area. This alarm signal may take any desired form, examples being an audible alarm signal, a flashing light, or a display of a particular word, such as "escape."

As mentioned above, an aspect of the present invention is that it is possible to utilize a configuration capable of indicating the escape of a particular animal when a plurality of N animals are confined to the same area. In this arrangement, the alarm activation signals produced by each animal's receiver will comprise a different frequency (F1, F2, . . . FN). Accordingly, phase detector 80 is configured to produce a different output alarm signal (AC1 . . . ACN) for each received frequency. For example, if a dog with collar receiver 20 set to broadcast an alarm activation signal at frequency F2 has left the area, frequency F2 will cause detector 80 to generate alarm control indicator AC2 and light escape alarm unit 82. In this manner, the owner will know which animal has left the area.

There will now be described the further aspect of the present invention that automatically deactivates the deterrent circuits of the system when the animal escapes the confinement area, and also permits the owner or trainer to communicate with the animal by voice carried by radio transmission signals so as to command the animal to return to confinement, after which the system can then be reactivated.

Figure 5:
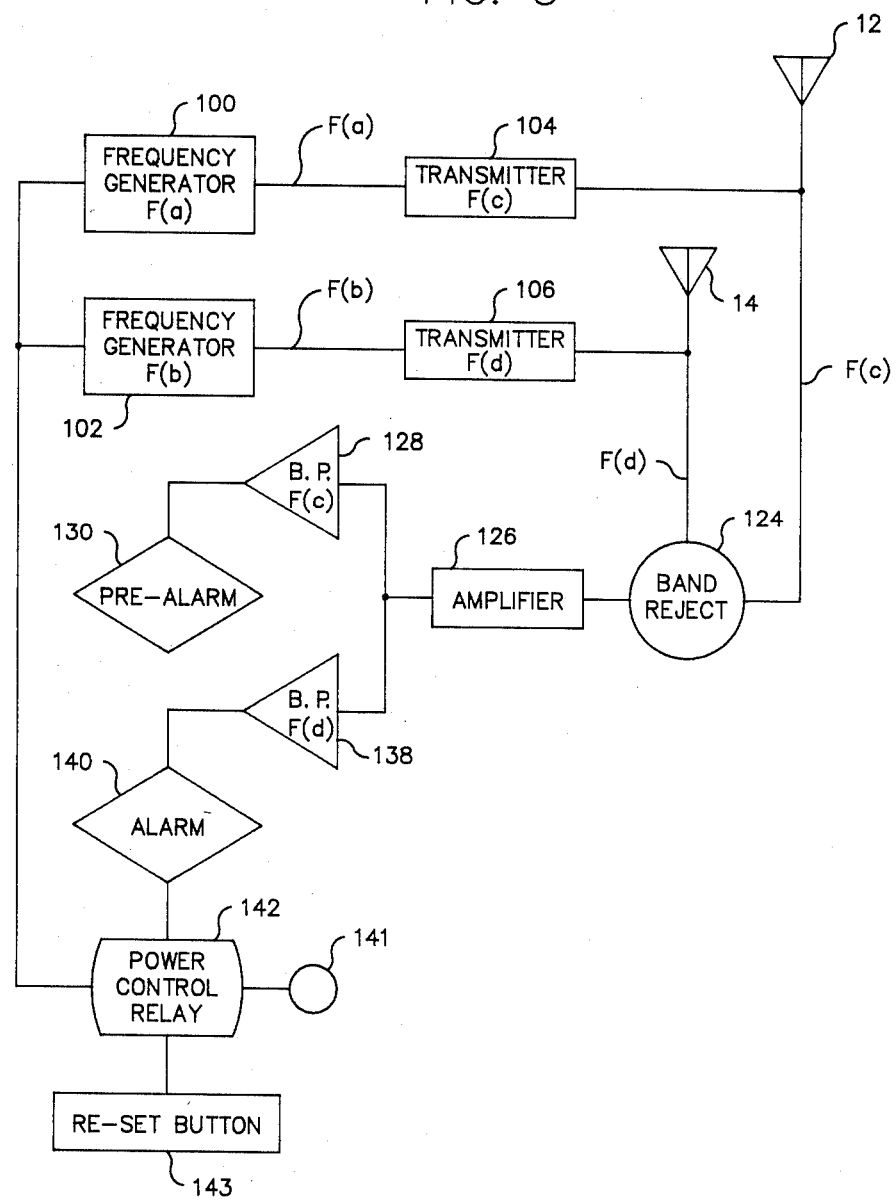
FIG. 5 illustrates an exemplary alarm and transmitter deactivation circuit combination at the home base of the arrangement of FIG. 1.

Referring to FIG. 5, frequency generators 100 and 102, similar to unit 16 in FIG. 1, located at home base, generate first and second oscillating signals F(a) and F(b) at frequencies of 20 KHz to 30 KHz, respectively although other frequencies could be used, as long as they don't interfere with each other. The signals are amplified and transmitted by transmitters 104 and 106, respectively, as is conventional, to loops 12 and 14, which broadcast the signals in their local area. As is well known in the art, generators 100 and 102 and transmitters 104 and 106 could be combined into one transmitter unit, referred to herein as the first transmitter, but it would be equivalent to provide separate units.

Figure 6:
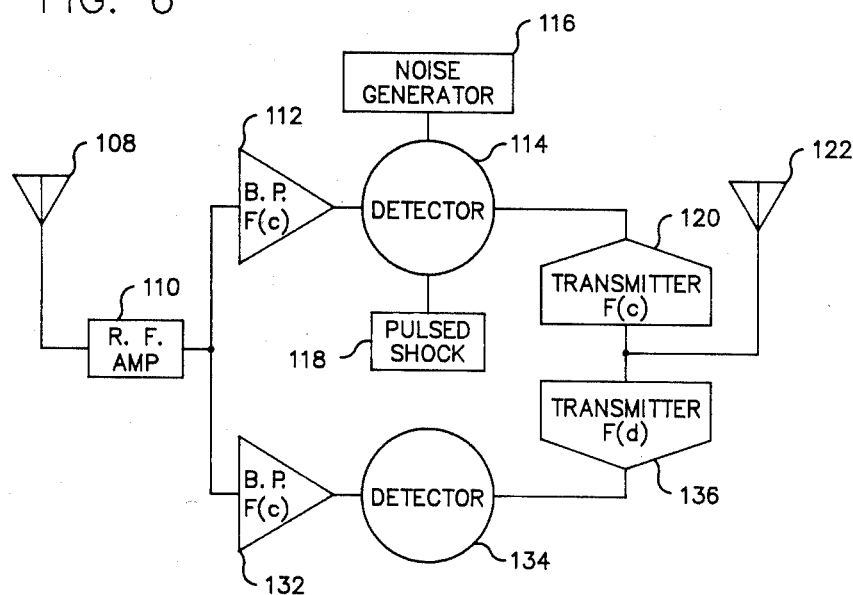
FIG. 6 illustrates an exemplary alarm circuit and deterrent circuit included in the animal's receiver for the arrangement of FIG. 1.

Now referring to FIG. 6, when the animal approaches loop 12, signal F(a) is received by a deterrent and first alarm trigger circuit via input antenna 108. Signal F(a) then passes to amplifier 110 which boosts the signal level sufficiently to energize the circuitry as is well known (a) gain of 100 is sufficient). The output of amplifier 110 is passed to a first band pass filter 112. Output from filter 112, only F(a), is input to first detector 114 to detect the presence of the known frequency of first signal F(a). Detector 114 produces a deterrent signal which is applied to the animal via noise generator 116 or electrical shock device 118, or both, as is well known, and described hereinabove. Output from first detector 114 also activates transmitter 120 which transmits a first alarm activation signal F(c) of 50 KHz frequency. First alarm signal F(c) is picked up by loop 12 and broadcast back to home base 18.

Referring again to FIG. 5, signal F(c) passes through first alarm activation circuit via dual band reject 124, which passes only frequencies between 40 KHz and 80 KHz. Output from band reject 124 is input to amplifier 126 and subsequently passed via bandpass filter 128, which passes only F(c), to first alarm device 130, such as a flashing LED, which tells the trainer that the animal is approaching loop 12.

If the animal continues past loop 12, despite the deterrent signal it receives, the effect of first transmitted signal F(a) will fade and the receiver 20 will begin to detect and respond to second signal F(b) from loop 14.

Again referring to FIG. 6, signal F(b) is received by a second alarm trigger circuit via antenna 108 amplified and passed alone through second bandpass filter 132, thence to second detector 134 which detects signal F(b). Detector 134 activates second transmitter 136 which transmits second alarm activation signal F(d) at 70 KHz to loop 14 for broadcast back to home base 18.

Referring again to FIG. 5, signal F(d) passes through a second alarm activation circuit via dual band reject 124, amplifier 126 and thence to second band pass filter 138, which passes only F(d), to activate second alarm 140, which can be a horn 141. Signal F(d) also activates power control relay 142 which deactivates transmitters 104 and 106. This tells the trainer that the animal has escaped the system and the system is deactivated so as to prevent shock to the animal when it reenters the confinement. The trainer is now ready to command the animal back to the confinement system by voice command. Thereafter, reset button 143 can be thrown to reactivate the system.

Figure 7:
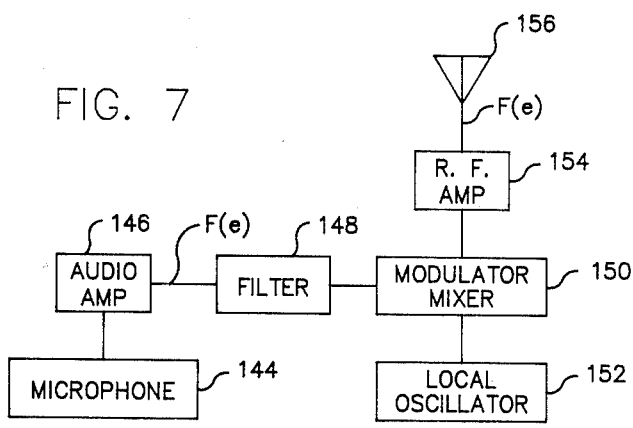
FIG. 7 illustrates an exemplary transmitter circuit for transmitting an owner's voice commands by radio from a predetermined location.

The trainer operates a portable transmitter, referred to herein as the second transmitter, capable of transmitting human voice by radio. Being portable, the second transmitter can be operated from the home base 18, within the confined area, or away from both areas. It would be equivalent if the second transmitter were not portable. FIG. 7 shows an exemplary circuit for producing and transmitting the signal referred to herein as third signal F(e). Microphone 144 has an element responsive to the human voice. Output from microphone 144 is amplified by amplifier 146 and filtered by filter 148 to provide a "clean" signal for input into modulator-mixer 150. Also inputting into modulator-mixer 150 is a local oscillator that oscillates at a frequency of 25 MHz to 30 MHz. Modulated r.f., output from modulator-mixer 150, is amplified by amplifier 154 and transmitted by antenna 156. A suitable microchip for providing the same function is sold by the Semiconductor Corporation, of Scottsdate, Arizona, with the chip number TDA-1220-B.

Figure 8:
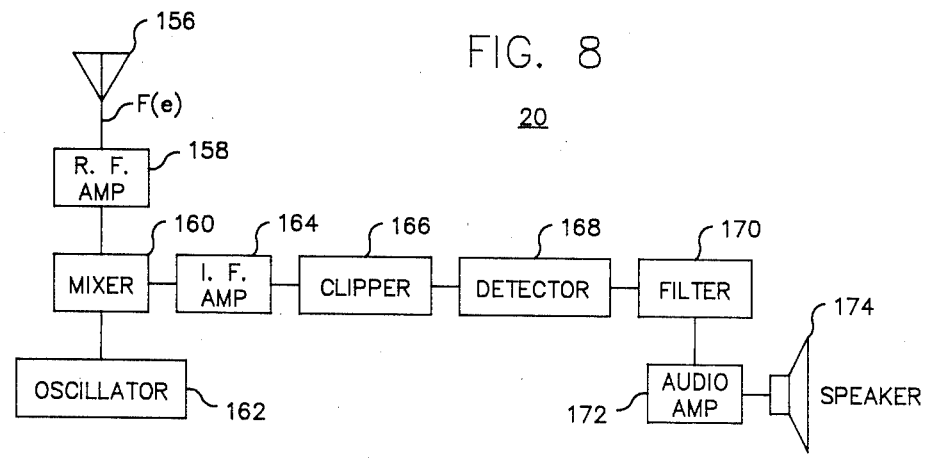
FIG. 8 illustrates an exemplary receiver circuit included in the animal's receiver for receiving and audibly broadcasting to the animal the owner's voice commands.

Receiver unit 20 has a radio receiving circuit responsive to the third signal F(e). FIG. 8 shows an exemplary circuit for such a function. The third signal F(e) is received by antenna 156, amplified by amplifier 158, as required to energize the remainder of the circuit, and input into mixer 160. Also, inputting mixer 160 is a local oscillator 162 which provides a reference signal, such as a signal at 455 KHz, as is well known. The combined signal from amplifier 160 and oscillator 162 is input into intermediate frequency amplifier 164 which then sends the signal into clipper 166 to remove any "spikes" in the signal due to random noise. Output from clipper 166 enters detector 168 which removes audio frequency signals from radio frequency signals, and inputs the audio frequency signal to band pass filter 170 adjusted to remove 60 cps "hum" and other noise. Subsequently, the audio signal is amplified in amplifier 172 and ultimately emits from speaker 174 as a human voice capable of being heard and obeyed by the animal.

It should be understood that FIGS. 7 and 8 show exemplary circuits for transmitting voice commands from the trainer and for receiving and broadcasting such commands audibly to the animal via receiver unit 20. Other commercially available circuits, including those that may be available on microchips, which provide like functions would be equivalent. Also as set forth hereinabove, slightly different frequencies can be chosen for a particular animal, thereby facilitating the confinement of a plurality of animals.

Having now illustrated and described my invention, it is not intended that such description limit this invention, but rather that this invention be limited only by reasonable interpretation of the appended claims.

What is claimed is:

1. An arrangement for confining at least one animal to a designated area and for permitting a trainer to communicate by voice with said animal comprising:
   (a) a first transmitter located at a base station capable of generating a first signal F(a) and a second signal F(b);
   (b) a second transmitter placed at a predetermined location capable of generating a third signal F(e) for transmitting human voice by radio;
   (c) a first signal-emitting wire responsive to said first transmitted signal F(a) and a second signal-emitting wire responsive to said second transmitted signal F(b), said first and second wires disposed in a concentric arrangement as an inner wire and an outer wire, respectively, so as to define said designated area;
   (d) a receiver capable of being attached to the animal and responsive to said first, second and third transmitted signals, F(a), F(b) and F(e), said receiver including:
      (i) a deterrent circuit responsive to said first transmitted signal F(A) for producing as an output a deterrent signal which is applied to the animal and a first alarm activation signal F(c);
      (ii) an alarm trigger circuit responsive to said second transmitted signal F(b) for producing as an output a second alarm activation signal F(d);
      (iii) a radio receiving circuit responsive to said third signal F(e) for producing as an output the voice of said trainer audible to the animal; and
   (d) an alarm receiver placed at a predetermined location including:
      (i) a first alarm activation circuit responsive to said first alarm activation signal F(c) for producing as an output a first pre-alarm signal;
      (ii) a second alarm activation circuit responsive to said second alarm activation signal F(d) for producing as an output a second escape alarm signal and a signal for deactivation of said first transmitter.

2. The confinement arrangement of claim 1 wherein said receiver deterrent circuit produces an electric shock as a output deterrent signal.

3. The confinement arrangement of claim 1 wherein said receiver deterrent circuit produces as an output deterrent signal an audio signal at a predetermined frequency which is unpleasant to at least one animal.

4. The confinement arrangement of claim 1 wherein said receiver deterrent circuit produces as an output deterrent signal both an electric shock and an audio signal at a predetermined frequency which is unpleasant to at least one animal.

5. The confinement arrangement of claim 1 wherein said deterrent circuit includes:
   (a) an antenna capable of receiving the deterrent signal F(a) broadcast by first signal-emitting wire;
   (b) amplifying means coupled to the output of said antenna for amplifying the received signal;
   (c) filtering means responsive to the amplified signal for passing frequency component F(a);
   (d) detecting means coupled to the output of said filtering means for detecting the presence of frequency F(a) broadcast by said first signal-emitting wire and providing as an output a control signal;
   (e) deterrent means responsive to the control signal from said detecting means for providing a deterrent output signal; and,
   (f) transmitting means responsive to the control signal from said detecting means for providing a first alarm activation signal F(c).

6. The confinement arrangement of claim 1 wherein the alarm trigger circuit includes:
   (a) an antenna capable of receiving the second transmitted signal F(b) broadcast by second signal-emitting wire;
   (b) amplifying means coupled to the output of said antenna for amplifying the received signal;
   (c) filtering means responsive to the amplified signal for passing frequency component F(b);
   (d) detecting means coupled to the output of said filtering means for detecting the presence of frequency F(a) broadcast by first signal-emitting wire and providing as an output a control signal;
   (e) deterrent means responsive to the control signal from said detecting means for providing a deterrent output signal; and,
   (f) transmitting means responsive to the control signal from said detecting means for providing a first alarm activation signal F(c).

7. The confinement arrangement of claim 1 wherein said first alarm activation circuit includes:

(a) band reject means for passing only frequencies between a first and second predetermined value;
(b) amplifying means for amplifying the received signal;
(c) filtering means responsive to the amplified signal for passing frequency component F(c); and,
(d) first alarm means responsive to the filtered signal for providing an alarm to the trainer.

8. The arrangement of claim 7 in which the first and second predetermined frequencies are 40 KHz and 80 KHz, respectively.

9. The confinement arrangement of claim 1 wherein said second alarm activation circuit includes:
(a) band reject means for passing only frequencies between a first and a second predetermined value;
(b) amplifying means for amplifying the received signal;
(c) filtering means responsive to the amplified signal for passing frequency component F(d);
(d) second alarm means responsive to the filtered signal for providing a second alarm to the trainer;
(e) power control relay means responsive to the filtered signal for deactivating the first transmitter; and
(f) reset button means for selectively reactivating the first transmitter at the trainer's discretion.

10. The arrangement of claim 9 in which the first and second predetermined frequencies are 40 KHz and 80 KHz.

11. The confinement arrangement of claim 1 wherein the second transmitter includes:
(a) a microphone having an element responsive to the human voice;
(b) audio amplifying means for amplifying the output of the microphone;
(c) filtering means for filtering the signal from the amplifying means;
(d) local oscillator means for producing a signal between a first and second predetermined frequency;
(e) modulator-mixer means for receiving and combining the outputs of the filtering means and local oscillator means;
(f) r.f. amplifying means for amplifying the output of modulator-mixer means; and,
(g) an antenna for transmitting third signal F(e) produced by second transmitter.

12. The arrangement of claim 11 in which the first and second predetermined frequencies are 25 MHz and 30 MHz, respectively.

13. The confinement arrangement of claim 1 wherein the radio receiving circuit responsive to the third signal F(e) includes:
(a) an antenna capable of receiving the third signal F(e) broadcast from the third transmitter;
(b) amplifying means for amplifying the output of said antenna;
(c) local oscillator means for producing a reference signal at a predetermined frequency;
(d) mixer means for receiving and combining the outputs of the amplifying means and local oscillator means;
(e) intermediate frequency amplifying means for amplifying the output of the mixer means;
(f) clipper means responsive to the output of intermediate amplifying means for removing random noise from the signal;
(g) detecting means for removing audio frequency signals from the signal output of the clipper means;
(h) filtering means for removing audio frequency signals from the signal output of the clipper means;
(i) audio amplifying means for amplifying the signal output by the filtering means; and
(j) speaker means for emitting the audio signal from the audio amplifying means as human voice capable of being heard by the animal.

14. The arrangement of claim 13 in which the reference signal is at a frequency of 455 KHz.

* * * * *